Sept. 2, 1969   J. CHERNIAVSKYJ   3,464,643
FILM REEL END FASTENER
Filed April 29, 1968

Inventor:
Jaroslav Cherniavskyj.

By William J. Peele
John E. Peele Jr. Attys

3,464,643
FILM REEL END FASTENER
Jaroslav Cherniavskyj, Skokie, Ill., assignor to Bell & Howell Company, Chicago, Ill., a corporation of Illinois
Filed Apr. 29, 1968, Ser. No. 724,887
Int. Cl. B65 75/28
U.S. Cl. 242—74                                                   4 Claims

ABSTRACT OF THE DISCLOSURE

A slipping band take-up reel is provided with a hub about which a yieldable, unitary slippable tooth band is positioned. The internal surface of the band includes spring members and locators, the latter engaging the hub only under load conditions to resist deformation of the band by convolutions of film.

---

Figure 1:
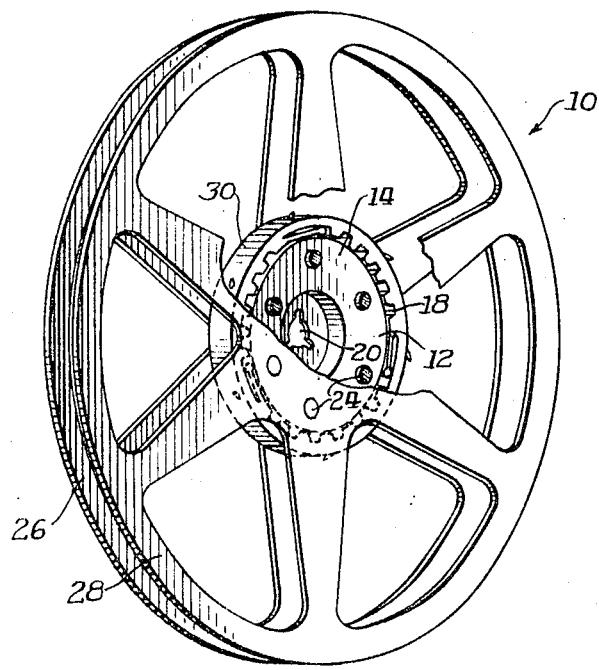

This invention relates to motion picture apparatus, and particularly to a self-latching take-up reel for use on a motion picture projector, the reel having a slipping band providing a substantially constant torque under film taking-up load regardless of the number of convolutions of film wound thereon.

Motion picture projectors are known which automatically thread film through the film path of the machine and toward the take-up reel. To enable the reels to automatically secure the film after the threading operation, several reels have been designed with a band or ring slippable relative the hub of the reel. The band or ring is provided with outwardly extending teeth for engaging the perforations of a film. The slippable engagement is required to permit film to engage on the powered take-up reel without damaging the performations of the film which moves into engagement much more slowly than the toothed ring is being rotated. Such reels are disclosed in U.S. Patents Nos. 1,322,114, 3,053,465, and 3,298,625.

The known reels have limitations and disadvantages in one or more areas. In some, the slipping band or ring cinches about the reel hub upon the winding thereon of more than the first three or four convolutions of film. The cinching of these film convolutions may cause frictional sliding of film against the film, and ultimate damage to the film. Further, cinching of outer convolutions may cause the film to pull inner convolutions relatively tight so as to cause the slipping band to be positively driven by the reel hub and to thus pull film through the projection gate of the projector, particularly in projectors without film control sprockets beyond the projection gate.

Other known reels have overcome the above mentioned disadvantage, but at the expense of providing less than a constant torque as is desirable for the take-up reel in most motion picture projectors. Some of these reels have attempted to overcome these disadvantages by the use of multiple components requiring significant assembly time and higher cost than is desired for a mass produced device.

This invention discloses a take-up reel assembly including a rotatably drivable, disk-like hub portion having a thickness substantially the same as the width of a film to be wound on the reel. To opposite side surfaces of the hub portion, a pair of flanges are fixed. A unitary, yieldable toothed ring or band is arranged about the hub portion during manufacture of the assembly. This band member is arranged substantially concentrically about the peripheral surface of the hub portion for rotational drive thereby, but in slippable engagement therewith. Under no-load conditions, only spaced spring members formed integral with the interior surface of the band engage the hub member. However, under certain load conditions, locators, also integral with the band member, are caused to engage the hub member between the spring members to resist deformation of the band member.

Thus, it is an object of the present invention to provide a novel and improved take-up reel assembly of low cost and of constant performance.

Another object of the invention is to provide a take-up reel assembly having a slippable band about a hub assembly which band is subject to different torque considerations as required.

Further and other objects will be apparent from the description of the accompanying drawings in which like numerals refer to like parts.

Figure 2:
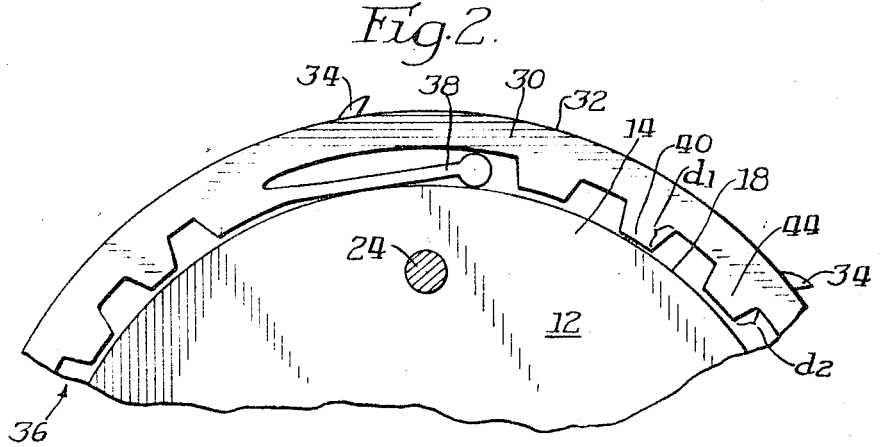

In the drawings:

FIG. 1 is a perspective view of a reel assembly including the present invention, with parts broken away; and FIG. 2 is an enlarged detailed view of a portion of the reel assembly of FIG. 1.

As disclosed in the drawings, a preferred embodiment of take-up reel assembly 10 of the present invention includes hub member 12 having a first side surface 14, an opposite or second side surface (not shown), and an annular or peripheral surface 18. Hub member 12 is preferably formed of a plastic material by molding. A spindle receiving opening 20 is formed in the hub member for mounting the member and the assembly on the rotatably driveable take-up spindle of a motion picture projector (not shown) for operation as a take-up reel onto which a film (not shown) is wound. The hub member further includes flange holding portions 24 on which reel flanges 26, 28 are positioned and fixed to the hub member so as to form a rotatably driveable unit.

A unitary annular ring or band member 30 is provided to surround hub member 12 between flanges 26, 28. The band member is formed of a material having desirable frictional characteristics relative to the material of hub member 12. In the preferred embodiment, the band member is molded of the same plastic material as that of the hub member, but with such dimensions as to be slightly yieldable in radial directions under pressures as may be induced by convolutions of film thereabout. Band member 30 has an external peripheral surface 32 from which extends a plurality of spaced teeth 34 for engagement in perforations of a film to be wound therearound. Alternate of these teeth may be aligned in axially spaced rows to encourage engagement thereof in perforations spaced different distances from the longitudinal edge of different films. The band member also has an internal surface 36 in which a plurality of spring members 38 are integrally formed as small leaf springs having substantially radial biasing characteristics. Each of these spring members is additionally configured so as to have a desired yieldability characteristic and so as to engage a portion of the peripheral surface 18 of the hub member. Although a greater number than the three spring members 38 in this preferred embodiment may be formed, the three members are considered the minimum to obtain concentricity of the band member relative to the hub member, and equal distribution of band engagement with that member. Under no-load conditions of the reel assembly, that is, when no film convolutions surround the hub, these spring members alone engage peripheral surface 18 of the hub member. This engagement generates sufficient torque to rotate the band member with the hub member.

A primary locator or friction member 40 is formed on and with the internal surface of band member 30 between each pair of adjacent spring members 38. These locators are molded with the band member to have a first radial depth $d_1$, which is slightly less than the spring depth caused by the spring members at no-load condition. When a first load condition is induced by film convolutions about the band member, that member deforms slightly to cause the primary locators to engage the hub member, and prevent further deformation of the spring members. Because of the selection of materials for the components, little additional friction is introduced in excess of that friction generated by the spring members. However, this friction is sufficient to transmit hub member rotation to the band member, yet to permit the band member to slip relative thereto.

One or more secondary locator or friction members 44 may also be formed on and with the internal surface of band member 30 between spring members 38. These locators are molded with the band member at a slightly less radial depth $d_2$ than the radial depth $d_1$ of the primary locators. Although the primary locators may perform a dual function, the secondary locators resist deformation of band member 30 under a second load condition. This latter condition may occur when the perforations in the leading end of a film first engage teeth on the band member, and the band member is suddenly distorted.

From the above description, the band member of the reel assembly is understood to be arranged about the hub member for slippable rotation relative thereto. The locators of the band member serve to resist excessive distortion of the band member, and to assure relatively free rotation of that member regardless of the load conditions induced by convolutions of the film wound thereabout.

The embodiments of the invention in which an exclusive property or privilege is claimed are defined as follows:

1. An improved take-up reel assembly having a driveable hub member fixedly connecting a pair of flanges for rotation as a unit about an axis, said hub member having a peripheral surface of a frictional characteristic, the assembly comprising:
   a yieldable unitary band member having a width substantially the same as the width of the peripheral surface of said hub member, a toothed external surface, and an internal surface;
   said band member being arranged about said hub for rotation therewith and slippable engagement thereon;
   a plurality of spring members formed integrally with said band member and spaced along the internal surface thereof for engagement with said hub member to maintain said band in substantially concentric arrangement relative said hub member when said assembly is in a no-load condition; and
   at least one locator member formed integrally with said internal surface of said band member between adjacent of said spring members to resist deformation of said band member upon a load condition induced by film convolutions about said band member.

2. An improved take-up reel assembly as claimed in claim 1, said locator members being primary friction members having a first radial depth and said band members including secondary friction members having a second radial depth and at least one being spaced between said spring members adjacent each of said primary members to resist deformation of said band member upon a load condition greater than said first load condition being induced by said film convolutions.

3. An improved take-up reel assembly as claimed in claim 2 wherein the first radial depth of said primary members is closer to the periphery of said hub member at no-load condition of said assembly than the second radial depth of said secondary members.

4. An improved take-up reel assembly as claimed in claim 1 wherein said spring members are three in number and are in radial urging contact with said hub member to apply substantially equal frictional torque to said peripheral surface of said hub member at spaced contact points.

References Cited
UNITED STATES PATENTS

| | | | |
|---|---|---|---|
| 1,322,114 | 11/1919 | Jenkins | 242—74.2 |
| 3,053,465 | 9/1962 | Michaels. | |
| 3,298,625 | 1/1967 | Babcock | 242—74 X |

NATHAN L. MINTZ, Primary Examiner